US012444063B2

(12) United States Patent
Ivie et al.

(10) Patent No.: US 12,444,063 B2
(45) Date of Patent: Oct. 14, 2025

(54) SYSTEMS AND METHODS FOR ALIGNING DIGITAL SLIDE IMAGES

(71) Applicant: Leavitt Medical, Inc., Lehi, UT (US)

(72) Inventors: Michael Andrew Ivie, Orem, UT (US); John Bitner Wirthlin, Salt Lake City, UT (US)

(73) Assignee: Leavitt Medical, Inc., Lehi, UT (US)

( * ) Notice: Subject to any disclaimer, the term of this patent is extended or adjusted under 35 U.S.C. 154(b) by 377 days.

(21) Appl. No.: 17/966,045

(22) Filed: Oct. 14, 2022

(65) Prior Publication Data

US 2023/0117821 A1  Apr. 20, 2023

Related U.S. Application Data

(60) Provisional application No. 63/256,575, filed on Oct. 16, 2021.

(51) Int. Cl.
*G06T 7/33* (2017.01)
*G06T 7/00* (2017.01)
*G06T 7/73* (2017.01)

(52) U.S. Cl.
CPC ............ *G06T 7/337* (2017.01); *G06T 7/0012* (2013.01); *G06T 7/74* (2017.01); *G06T 2207/10056* (2013.01); *G06T 2207/20081* (2013.01); *G06T 2207/30024* (2013.01); *G06T 2207/30204* (2013.01)

(58) Field of Classification Search
CPC ......... G06T 7/337; G06T 7/74; G06T 7/0012; G06T 2207/10056; G06T 2207/20081; G06T 2207/30024; G06T 2207/30204
See application file for complete search history.

(56) References Cited

U.S. PATENT DOCUMENTS

| 11,857,358 | B2 * | 1/2024 | Liu | G06T 5/50 |
| 11,989,959 | B2 * | 5/2024 | Pelkmans | G06V 20/695 |
| 2018/0035966 | A1 * | 2/2018 | Merlet | G06T 7/33 |
| 2021/0097684 | A1 * | 4/2021 | Mellen | G16B 15/00 |

FOREIGN PATENT DOCUMENTS

EP  2544583 B1 *  3/2016  ........... A61B 5/0064

OTHER PUBLICATIONS

Written Opinion dated Feb. 10, 2023, for International Application No. PCT/US22/46694; 5 pages.

* cited by examiner

*Primary Examiner* — Shefali D Goradia
(74) *Attorney, Agent, or Firm* — Greenberg Traurig, LLP (57) ABSTRACT

The disclosed computer-implemented method may include (1) receiving an image of a section of a sectionable tissue sample block, the image including image data of, embedded into the section of the sectionable tissue sample block, (A) a section of a tissue sample, and (B) a section of a sectionable fiducial marker, (2) determining an attribute of the section of the sectionable fiducial marker from the received image of the section of the sectionable tissue sample block, and (3) executing a tissue sample management action based on the determined attribute of the section of the sectionable fiducial marker. Various other methods, systems, apparatuses, and computer-readable media are also disclosed.

20 Claims, 7 Drawing Sheets

SYSTEMS AND METHODS FOR ALIGNING DIGITAL SLIDE IMAGES

CROSS-REFERENCE TO RELATED APPLICATION

This application claims the benefit of U.S. Provisional Patent Application No. 63/256,575, filed Oct. 16, 2021, the disclosure of which is incorporated, in its entirety, by this reference.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 5A is a top view of a first tissue sample slide, FIG. 5B is a top view of a second tissue sample slide.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

In preparing a patient tissue sample for microscopic analysis, a pathologist may cause the tissue sample to be sectioned into multiple slices, also referred to as sections or levels. Each section or level of a tissue sample may be disposed upon a carrier medium, such as a transparent (e.g., glass) slide.

When a pathologist microscopically analyzes a tissue sample, the pathologist may find it useful to review multiple portions or sections of the sampled tissue to ensure nothing is overlooked. Some processes may require a detailed microscopic review of multiple portions of the same specimen taken from various sectioned slices or levels of the specimen. Additionally, when special stains are ordered for application to a tissue sample, all stained tissue may be reviewed in detail. Such a review may include multiple sections or levels of the tissue sample.

Furthermore, during analysis of a tissue sample, when a pathologist identifies an area of interest in one level, the pathologist may find it desirable to scrutinize corresponding areas of other levels and/or stains. Unfortunately, morphology presented by a tissue sample may vary significantly from level to level, sometimes making it difficult to visually locate corresponding points or locations across different levels. Conventional processes for identifying an area of interest at a first level, switching views to a second level, and especially identifying a location on the second level corresponding to the area of interest on the first level, may be tedious and/or prone to failure.

Additionally, to aid in and/or to facilitate some analytical processes, when using transparent (e.g., glass) slides, a pathologist may choose to overlay at least two slides and physically manipulate the slides until their corresponding sections or levels of the tissue sample are aligned (e.g., positionally and/or optically aligned) with one another. The pathologist may then mark the slides to identify areas of interest. Conventional methods of manipulation of transparent slides bearing tissue samples may be cumbersome, inconvenient, and/or prone to failure. Hence, the present application identifies and addresses a need for improved systems, methods, and apparatuses for aligning of tissue sample slide images to aid in analysis of such tissue samples.

The present disclosure generally relates to methods and systems for aligning (e.g., orienting, scaling, stretching, shrinking, resizing, keystone correction, etc.) digital slide images of a sectioned tissue sample. In some embodiments, the disclosed systems and methods may utilize at least one sectionable fiducial marker that is present in each section of the sectioned tissue sample (and therefore in each digital slide image of the respective sections of the tissue sample). Embedding sectionable fiducial markers along with the specimen (e.g., into a paraffin wax block that includes the specimen) in such a way as to ensure that the markers will consistently appear in the same position across all levels may create and/or enable common points of reference for alignment.

Embodiments of the systems and methods described herein may identify one or more sections of the sectionable fiducial marker(s) in each image to determine how to align the images to each other, including any appropriate reorienting, scaling, stretching, shrinking, etc., of the images. In some embodiments, in the aligned images, the parts of the sectioned tissue sample that originated from adjacent portions of the tissue (e.g., at each respective level) may be positioned (e.g., over each other, adjacent to each other, etc.) for simultaneous and/or overlapping viewing.

Accordingly, the methods and systems of the present disclosure may facilitate and/or improve the viewing of digital slide images of a sectioned tissue sample, such as for identification and diagnosis of abnormal tissue structures.

The following will provide, with reference to FIGS. 1-2 and 4-7, detailed descriptions of systems for aligning digital slide images. Detailed descriptions of corresponding computer-implemented methods will also be provided in connection with FIG. 3.

Figure 1:
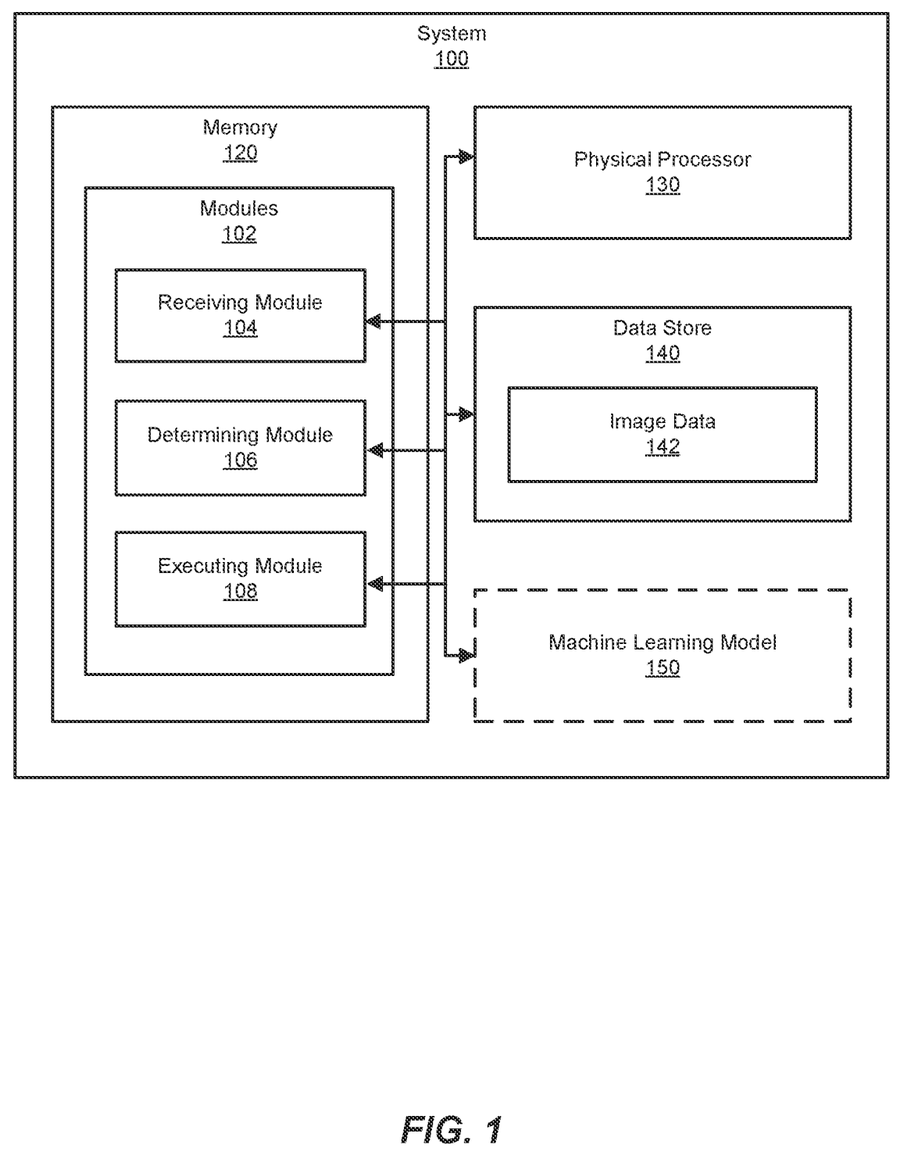
FIG. 1 is a block diagram of an example system for aligning digital slide images.

FIG. 1 is a block diagram of an example system 100 for aligning digital slide images. As illustrated in this figure, example system 100 may include one or more modules 102 for performing one or more tasks. As will be explained in greater detail below, modules 102 may include a receiving module 104 that may be configured to receive an image of a section of a sectionable tissue sample block. The image may include image data of, embedded into the section of the sectionable tissue sample block, (1) a section of a tissue sample, and (2) a section of a sectionable fiducial marker. As further shown in FIG. 1, modules 102 may also include a determining module 106 configured to determine an attribute of the section of the sectionable fiducial marker and/or an attribute of the section of the tissue sample from the received image of the section of the sectionable tissue sample block. Additionally, modules 102 may also include an executing module 108 configured to execute a tissue sample management action based on the determined attribute of the section of the sectionable fiducial marker.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As also shown in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate aligning of digital slide images in accordance with the systems and methods described herein. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also shown in FIG. 1, example system 100 may further include one or more data stores, such as data store 140, that may receive, store, and/or maintain data. Data store 140 may represent portions of a single data store or computing device or a plurality of data stores or computing devices. In some embodiments, data store 140 may be a logical container for data and may be implemented in various forms (e.g., a database, a file, a file system, a data structure, etc.). Examples of data store 140 may include, without limitation, files, file systems, data stores, databases, and/or database management systems such as an operational datastore (ODS), a relational database, a No SQL database, a NewSQL database, and/or any other suitable organized collection of data.

In at least one example, data store 140 may include (e.g., store, host, access, maintain, etc.) image data 142. As will be explained in greater detail below, in some examples, image data 142 may include and/or represent any image data that may include and/or be associated with, without limitation, one or more tissue samples, one or more tissue sample blocks, one or more sections of one or more sectionable tissue sample blocks, one or more tissue sample slides, and so forth.

As further shown in FIG. 1, example system 100 may optionally include a machine learning model 150. A machine learning model may be a data analysis tool that may find patterns within and/or make predictions regarding a previously unseen dataset. In some examples, machine learning model 150 may include any suitable model and/or algorithm including, without limitation, a linear regression algorithm, a logistic regression algorithm, a support-vector machine (SVM), a nearest neighbor classifier, a principal component analysis algorithm, a decision tree, a naïve Bayes classifier, a k-means clustering algorithm, and so forth.

One machine learning model that may be particularly useful for analyzing unstructured datasets such as image data, and hence may be included as part of machine learning model 150, may be an artificial neural network. Artificial neural networks are computing systems inspired by biological neural networks. Artificial neural networks may "learn" to perform tasks by processing example or training data, often without being pre-programmed with task-specific rules. An effectively trained artificial neural network can be a powerful tool to aid in modern computing tasks such as pattern recognition, process control, data analysis, social filtering, and so forth.

An example of training of an artificial neural network from a given example may include determining a difference (e.g., error) between a processed output of the artificial neural network (e.g., a predicted result) and a target output. A training system may then adjust internal probability-weighted associations of the artificial neural network according to a learning rule and the difference between the processed output and the target output. Successive adjustments may cause the artificial neural network to produce output (e.g., one or more predictions) that is increasingly similar to the target output.

In some embodiments, an artificial neural network may include any software and/or hardware composed of interconnected processing nodes. These processing nodes, which may be referred to as "artificial neurons," may receive inputs and pass outputs to other artificial neurons. The output of each artificial neuron may be determined by a non-linear function combination of each input to the artificial neuron, and each connection between artificial neurons may be assigned a "weight" that determines the degree to which a particular connection contributes to the output of the destination neuron(s).

Artificial neural networks may be used in a variety of contexts, including, without limitation, computer vision (e.g., image recognition and object detection), natural language processing (e.g., translation and speech recognition), medical diagnosis and recommendation systems.

Artificial neural networks may be implemented in a variety of ways. In some embodiments, an artificial neural network may be implemented as software programs and/or any other suitable form of computer-readable instructions that are executed on one or more physical processors. In further embodiments, an artificial neural network may be implemented in physical hardware, such as a series of interconnected physical processors with each processor unit acting as an artificial neuron. Hence, although some examples described herein may explain and/or illustrate machine learning model 150 in the context of a software-implemented artificial neural network, machine learning model 150 may, in some examples, be implemented in any suitable physical hardware.

Figure 2:
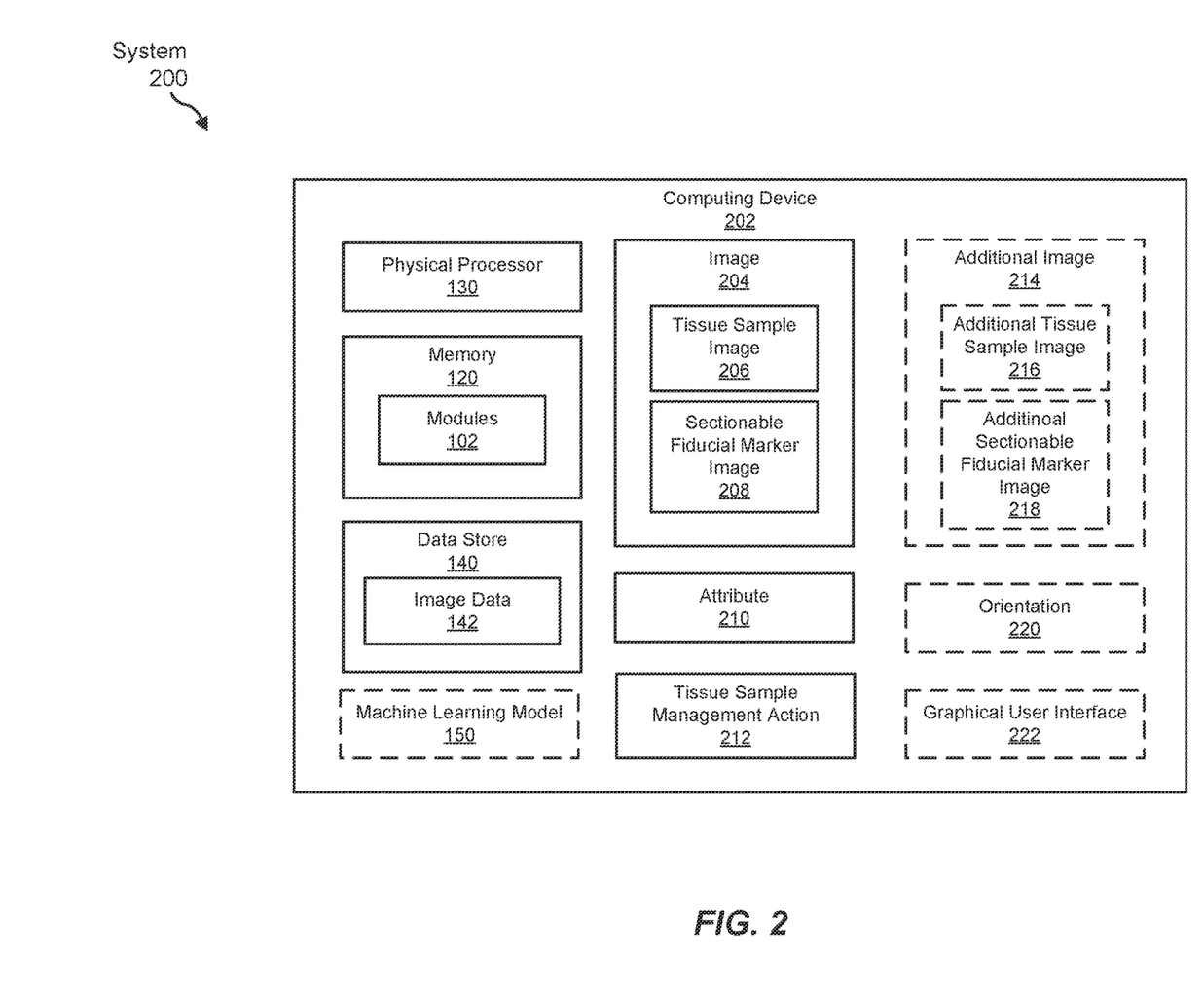
FIG. 2 is a block diagram of an example implementation of a system for aligning digital slide images.

Example system 100 in FIG. 1 may be implemented in a variety of ways. For example, all or a portion of example system 100 may represent portions of an example system 200 ("system 200") in FIG. 2. As shown in FIG. 2, system 200 may include a computing device 202. In at least one example, computing device 202 may be programmed with one or more of modules 102.

In at least one embodiment, one or more modules 102 from FIG. 1 may, when executed by computing device 202, enable computing device 202 to perform one or more operations to align digital slide images. For example, as will be described in greater detail below, receiving module 104 may, when executed by computing device 202, cause computing device 202 to receive an image (e.g., image 204) of a section of a sectionable tissue sample block. The received image may include image data of a section of a tissue sample embedded into a tissue sample block (e.g., tissue sample image 206) and a section of a sectionable fiducial marker embedded into the tissue sample block (e.g., sectionable fiducial marker image 208).

Additionally, determining module 106 may, when executed by computing device 202, cause computing device 202 to determine an attribute of the section of the sectionable fiducial marker (e.g., attribute 210) from the received image 204 of the section of the sectionable tissue sample block. The attribute may include any suitable attribute including, without limitation, at least one wavelength of light (e.g., color) reflected by the section of the sectionable fiducial marker, a shape of the section of the sectionable fiducial marker, an orientation of the section of the sectionable fiducial marker, or a position of the section of the sectionable fiducial marker within the section of the sectionable tissue sample block.

Determining module 106 may also, when executed by computing device 202, cause computing device 202 to determine an attribute of the section of the tissue sample from the received image 204. The attribute may include any suitable attribute including, without limitation, morphology, phenotype, shape, size, at least one wavelength of reflected light (e.g., color), etc. of the tissue sample.

In some implementations, tissue sample image 206 may include an image of a tissue array, including multiple sections of tissue from one or more patients. Determining module 106 may, when executed by computing device 202, cause computing device 202 to determine a location of each section of tissue in the tissue array relative to the section of the sectionable fiducial marker in image 204. This location information may facilitate the automatic identification of each section of tissue in the tissue array and its origin (e.g., the originating patient). In addition, the location information can facilitate the presentation of a single image or multiple images of tissue samples from an individual patient or from multiple patients for review by a user (e.g., a pathologist).

In some examples, as further shown in FIG. 2, one or more of the systems described herein may optionally include and/or perform operations involving an image of an additional section of the sectionable tissue block (e.g., additional image 214). For example, in some embodiments, receiving module 104 may optionally receive an image of an additional section of the sectionable tissue block (e.g., additional image 214) that may include an image of an additional section of the tissue sample (e.g., additional tissue sample image 216) and an image of an additional section of the sectionable fiducial marker (e.g., additional sectionable fiducial marker image 218).

Furthermore, executing module 108 may, when executed by computing device 202, cause computing device 202 to execute a tissue sample management action (e.g., tissue sample management action 212) based on the determined attribute of the section of the sectionable fiducial marker. For example, executing module 108 may determine an orientation of the sectionable fiducial marker (e.g., orientation 220) based on the attribute of the sectionable fiducial marker (e.g., a shape of the sectionable fiducial marker, a gradient of wavelengths of light reflected by the section of the sectionable fiducial marker, etc.). In some examples, one or more of modules 102 (e.g., executing module 108) may further present one or more images to a user via a suitable graphical user interface (e.g., graphical user interface 222). In some examples, graphical user interface 222 may be separate from computing device 202 and in communication (e.g., wireless and/or wired communication) with computing device 202, such that the user can remotely access information (e.g., image 204 and/or additional image 214) from computing device 202.

Computing device 202 generally represents any type or form of computing device capable of reading and/or executing computer-executable instructions and/or hosting executables. Examples of computing device 202 include, without limitation, application servers, storage servers, database servers, web servers, and/or any other suitable computing device configured to run certain software applications and/or provide various application, storage, and/or database services.

In at least one example, computing device 202 may be a computing device programmed with one or more of modules 102. All or a portion of the functionality of modules 102 may be performed by computing device 202 and/or any other suitable computing system. As will be described in greater detail below, one or more of modules 102 from FIG. 1 may, when executed by at least one processor of computing device 202, may enable computing device 202 to align digital slide images (e.g., image 204 and additional image 214) in any of the ways described herein.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
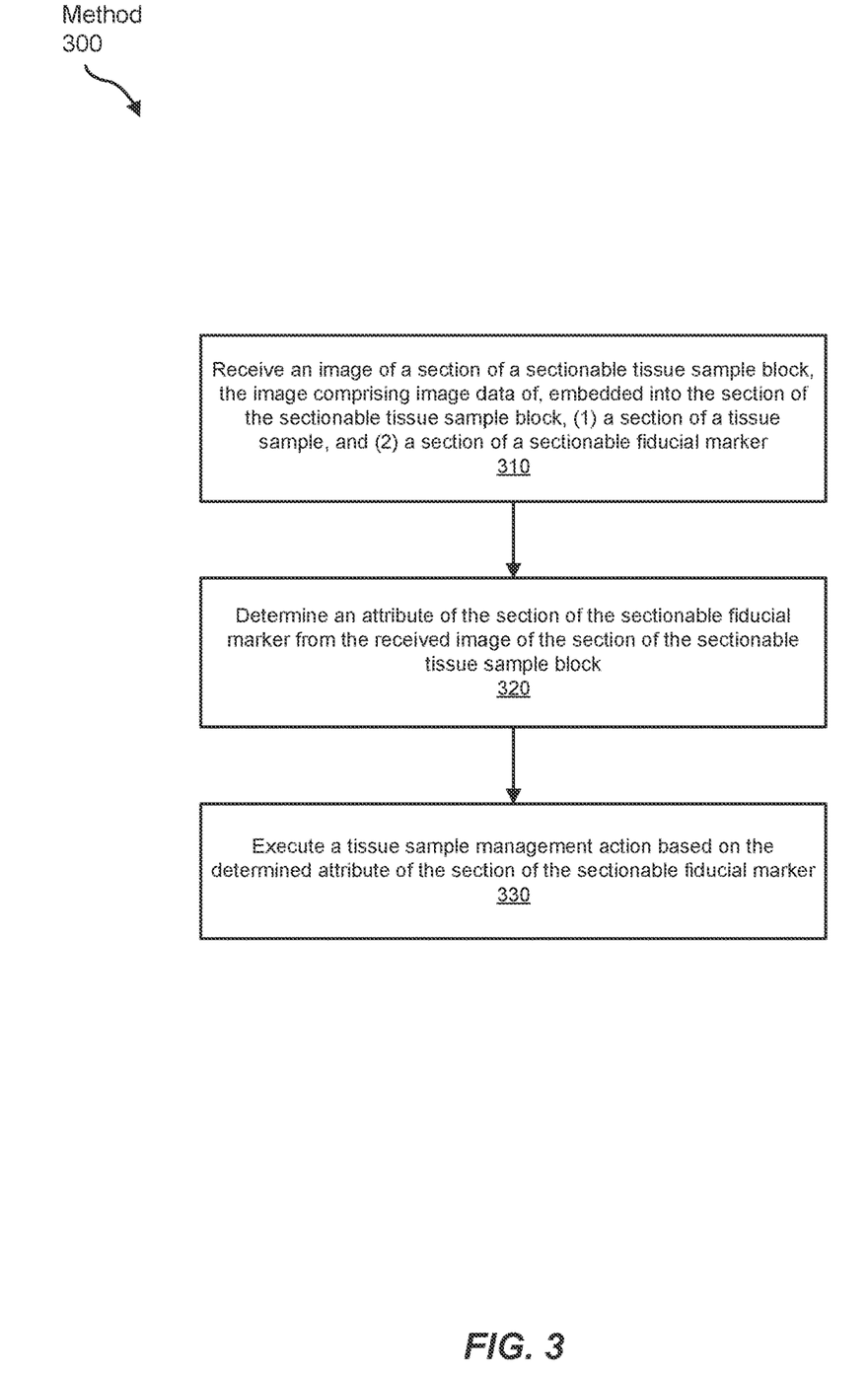
FIG. 3 is a flow diagram of an example method for aligning digital slide images.

FIG. 3 is a flow diagram of an example computer-implemented method 300 for aligning digital slide images. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, some examples of which will be provided in greater detail below.

As illustrated in FIG. 3, at step 310, one or more of the systems described herein may receive an image of a section of a sectionable tissue sample block. The image may include image data of a section of a tissue sample and a section of a sectionable fiducial marker. For example, receiving module 104 may, as part of computing device 202, receive, from data store 140, an image 204 that may include a tissue sample image 206 and a sectionable fiducial marker image 208. In some examples, receiving module 104 may also receive an additional image 214, which may be adjacent to, separate from, or overlaid on image 204, as explained above.

The material forming the sectionable fiducial markers described herein may be embedded into a wax block and infused with paraffin, while not significantly changing in size or shape. The material may also be capable of being cleanly cut on a microtome without dulling the blade. By way of example and not limitation, the material forming the fiducial(s) may include a polymer material, a gelatin material, and/or a tissue mimetic material. For example, a tissue mimetic material may include biological and/or synthetic materials that mimic a biological sample. In some embodiments, the tissue mimetic material may include at least one biological cell, a protein material, and/or a lipid material. Tissue mimetic materials that are suitable for forming the sectionable fiducial(s) of this disclosure are disclosed in U.S. Pat. No. 9,851,349, titled "MATRIX FOR RECEIVING A TISSUE SAMPLE AND USE THEREOF," issued Dec. 26, 2017, the entire disclosure of which is incorporated by reference herein. An example material that may be used to form the fiducial(s) may include at least one of: protein (e.g., animal protein), one or more lipids (e.g., animal fat, vegetable oil, etc.), glycerin, water, a gelling agent (e.g., an ionically gelled gelling agent), an inorganic buffer, an anti-foaming agent, and/or a paraffin wax material.

In some examples, a sectionable fiducial marker may include a material or a gap in a material such that the fiducial markers are optically identifiable from surrounding material of the section (e.g., paraffin wax). For example, a sectionable fiducial marker may have a shape (e.g., rectangle, square, triangle, star-shaped, arrow-shaped, plus-shaped, circle, parallelogram, trapezoid, etc.), orientation, and/or size that can be identified. In some examples, multiple sectionable fiducial markers may be included in each section to improve and facilitate image alignment. In some embodiments, the shape, size, and orientation of the structure surrounding the tissue sample may itself be used as a fiducial for digital image alignment purposes.

Figure 4A:
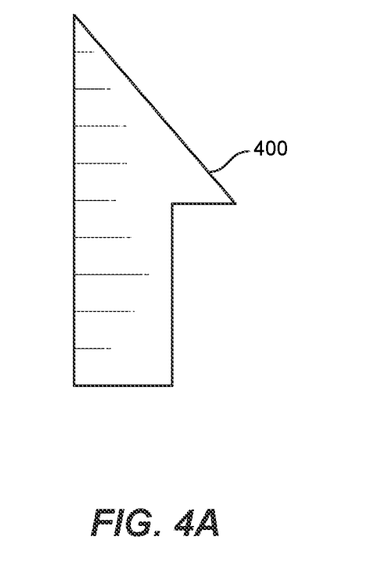
FIG. 4A is a plan view and FIG. 4B is a perspective view of a sectionable fiducial marker in accordance with some embodiments described herein.
Figure 4B:
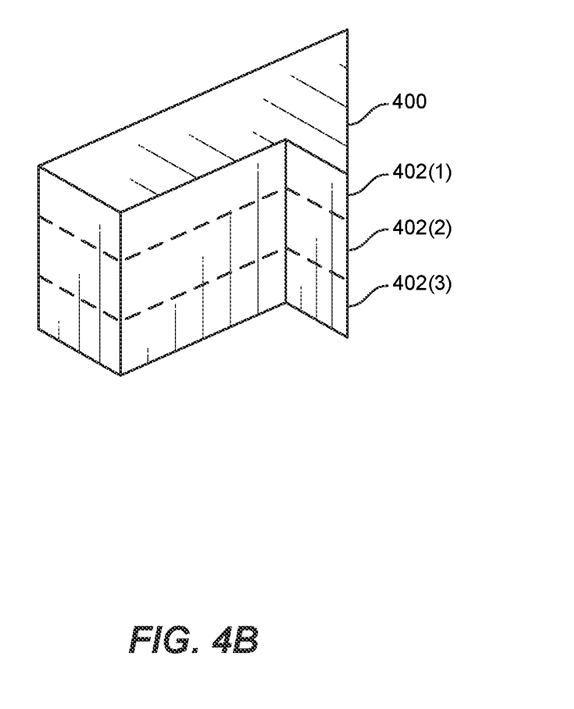

By way of example and/or illustration, FIG. 4A is a plan view of an example of a sectionable fiducial marker 400 that may be embedded within a tissue sample block in accordance with some embodiments described herein. FIG. 4B shows a perspective view of sectionable fiducial marker 400. The sectionable fiducial marker 400 may be formed from a material that may be included within and/or sectioned as part of a sectionable tissue sample block.

As shown, sectionable fiducial marker 400 may have a distinct and/or identifiable shape or aspect that may indicate a particular direction and/or orientation. Note that the shape of the sectionable fiducial marker 400 is provided as an example only and that a sectionable fiducial marker may have any suitable form, shape, and/or aspect.

As shown in FIG. 4B, the sectionable fiducial marker 400 may be sectioned (i.e., transversely sectioned) into multiple fiducial marker sections 402 (e.g., fiducial marker section 402(1), fiducial marker section 402(2), and fiducial marker section 402(3)). When the sectionable fiducial marker 400 is embedded within a tissue sample block as described herein, and when the tissue sample block is sectioned as described herein, each section of the sectioned tissue sample block may include a different fiducial marker section 402.

In additional embodiments, a tissue block may be formed, one or more holes may be formed in the tissue block, and the one or more holes may be filled with a sectionable material, which may be optically distinguishable from a surrounding material of the tissue block after sectioning is complete. By way of example, the sectionable material may include a colored paraffin wax material, a particulate material (e.g., a pigment), etc.

Using a sectionable structure to cradle or surround the tissue may provide containment that limits the area in which tissue may be found as well as a place to include markers that would correspond to the orientation of the tissue. Hence, in some embodiments, the tissue sample may be placed within a pre-formed structure including one or more sectionable fiducial markers therein. The tissue sample and structure may be processed together to form a tissue block. Hence, the sectionable fiducial marker and the tissue sample may be embedded within a sectionable tissue sample block. Sections of the tissue block, including of the tissue sample and the structure that includes the sectionable fiducial marker, may be taken (e.g., microtome sectioned) and placed on slides.

Figure 5A:
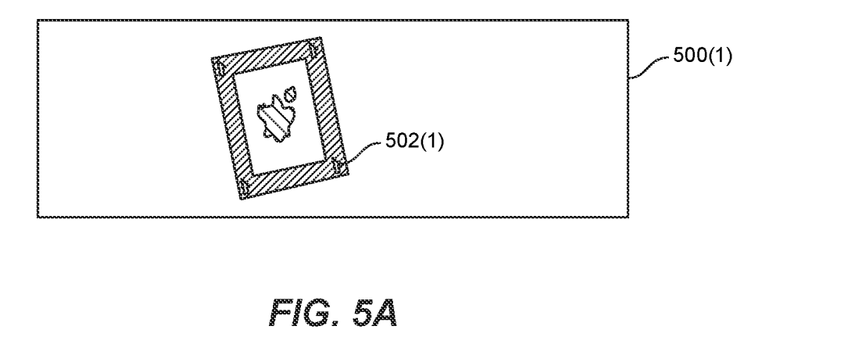
Figure 5B:
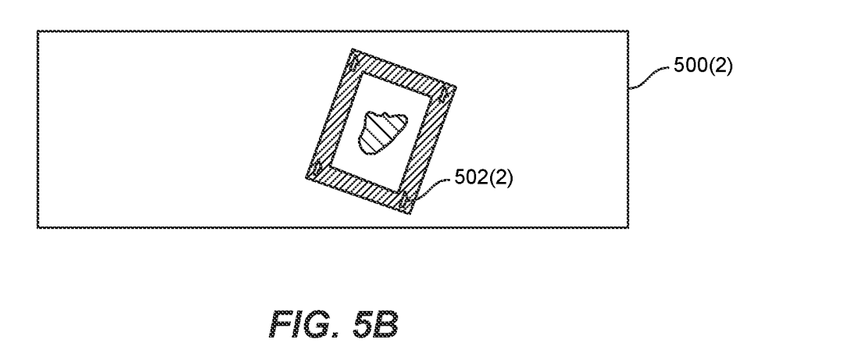
Figure 5C:
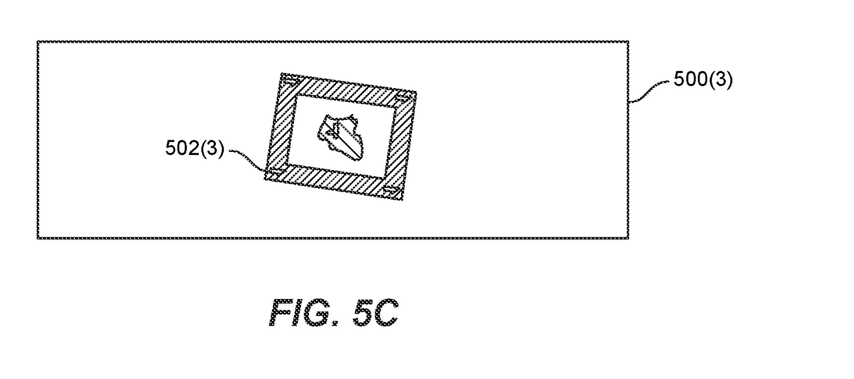
FIG. 5C is a top view of a third tissue sample slide, in accordance with some embodiments described herein.

By way of illustration, FIGS. 5A through 5C show a set of tissue sample slides 500 (e.g., tissue sample slide 500(1), tissue sample slide 500(2), tissue sample slide 500(3)) that each include a different section of a sectioned tissue sample block. As shown, each slide may include a structure (e.g., a rectangular structure) at least partially surrounding a respective section of the tissue sample. The structure may be a sectionable structure that may include one or more sectionable fiducial markers. The one or more sectionable fiducial markers, either alone or in combination with each other, may have an identifiable orientation to facilitate automatic orientation of corresponding digital slide images.

In some examples, digital images may be taken (e.g., via one or more digital imaging devices) of the tissue sample slides, hence generating one or more images of one or more sections of a sectioned tissue sample block. These images may be included as part of image data 142, with each image including image data of a section of a tissue sample and image data of a section of a sectionable fiducial marker. Receiving module 104 may receive image 204 that may include the tissue sample image 206 and the sectionable fiducial marker image 208. As will be described in greater detail below, one or more of modules 102 (e.g., determining module 106) may identify fiducial markers in the images of the structure (e.g., a section of a sectionable fiducial marker), and one or more of modules 102 (e.g., executing module 108) may align at least some of the images with each other based on the location, size, and orientation of the respective fiducial markers.

Returning to FIG. 3, at step 320, one or more of the systems described herein may determine an attribute of the section of the sectionable fiducial marker from the received image of the section of the sectionable tissue sample block. For example, determining module 106 may, as part of computing device 202, determine an attribute 210 of a section of a sectionable fiducial marker from image 204 and/or sectionable fiducial marker image 208.

Attribute 210 may include any suitable attribute of a sectionable fiducial marker that may be determined from an image of a section of the sectionable fiducial marker. This may include, without limitation, a wavelength of light (e.g., color) reflected by the section of the fiducial marker, a shape of the section of the sectionable fiducial marker, an orientation of the section of the sectionable fiducial marker, a position of the section of the sectionable fiducial marker within the section of the sectionable tissue sample block, and so forth.

Determining module 106 may determine attribute 210 in a variety of contexts. For example, determining module 106 may receive and/or analyze any suitable data or metadata associated with image 204, tissue sample image 206, and/or sectionable fiducial marker image 208 to determine attribute 210 using any suitable image analysis method or technique.

In some examples, determining module 106 may determine attribute 210 by analyzing the image of the section of the sectionable tissue sample block in accordance with a machine learning model pre-trained to predict attributes of sections of sectionable fiducial markers based on images of sections of sectionable fiducial markers. As described above, a machine learning model, such as an artificial neural network, may be pre-trained (e.g., using a plurality of pre-labeled images of sections of sectionable fiducial markers) to predict attributes of sections of sectionable fiducial markers when provided with new images of sections of sectionable fiducial markers. Determining module 106 may provide sectionable fiducial marker image 208 to machine learning model 150, which may produce a prediction of an attribute of the section of the sectionable fiducial marker imaged in sectionable fiducial marker image 206. Determining module 106 may therefore assign the predicted attribute received as output from machine learning model 150 as attribute 210.

In some examples, determining module 106 may train machine learning module 150 to predict attributes of sections of sectionable fiducial markers by analyzing a plurality of pre-labeled images of sections of sectionable fiducial markers in accordance with a predefined machine learning model training method (e.g., a supervised training method). Determining module 106 may then adjust one or more attributes of the machine learning model (e.g., one or more parameters, one or more hyperparameters, one or more mathematical models, etc.) based on the analyzing of the plurality of pre-labeled images of sections of sectionable fiducial markers.

With the use of machine learning, sectionable fiducial markers can be reliably detected even with minor variations from image to image that may occur due to processing, sectioning, placement on the slide, and/or scanning.

In additional examples, determining module 106 may train machine learning module 150 to predict attributes (e.g., morphologic and/or phenotypic attributes) of sections of the tissue sample by analyzing a plurality of pre-labeled images of sections of tissue samples in accordance with a predefined machine learning model training method (e.g., a supervised training method). Determining module 106 may then adjust one or more attributes of the machine learning model (e.g., one or more parameters, one or more hyperparameters, one or more mathematical models, etc.) based on the analyzing of the plurality of pre-labeled images of sections of the tissue samples.

Returning to FIG. 3, at step 330, one or more of the systems described herein may execute a tissue sample management action based on the determined attribute of the section of the sectionable fiducial marker. For example, executing module 108 may, as part of computing device 202, execute a tissue sample management action 212 based on attribute 210.

In some examples, a tissue sample management action may include any action relative to a tissue sample that may enable a pathologist and/or tissue sample management system to access, analyze, maintain, and/or store the tissue sample. For example, the tissue sample management action 212 may include accessing a record associated with the tissue sample and stored by a tissue sample management system based on attribute 210.

In at least one embodiment, attribute 210 may include a shape of a section of a sectionable fiducial marker. In such examples, the tissue sample management action 212 may include determining, based on the shape of the section of the section of the sectionable fiducial marker, an orientation and/or position of the section of the sectionable fiducial marker within the section of the tissue sample block (e.g., orientation 220). This orientation 220 may be determined relative to the sectionable tissue sample block, a tissue sample slide that includes the section of the sectionable tissue sample block, the section of the tissue sample embedded into the section of the sectionable tissue sample block, and so forth.

The tissue sample management action 212 may further include using orientation and/or position of the sectionable fiducial marker (e.g., orientation 220) to calculate a transformation that effectively becomes the offset, rotation, stretch, skew, or flip necessary to orient the image within a unified coordinate system. In examples where there are multiple images included in a set (e.g., at least an image 204 and an additional image 214) the unified coordinate system may be common to all images in the set. The unified coordinate system may then be used (e.g., by executing module 108) to align the images of the various sections of the tissue sample. This method may work equally well for different levels and different stain types, provided the images all originated from the same paraffin block and include the structure with the fiducial markers.

In additional examples, tissue sample management action 212 executed by executing module 108 may include an action based on one or more attributes (e.g., morphologic and/or phenotypic attributes) of the tissue sample determined by determining module 106. For example, tissue sample management action 212 may include routing tissue sample image 206 to a particular pathologist and/or to a particular algorithm for review and potential diagnosis. If determining module 106 determines that the tissue sample image 206 indicates a high likelihood of abnormal tissue, the tissue sample image 206 could be categorized as a complex case requiring careful review by a pathologist and/or another specialized image analysis algorithm. Thus, tissue sample management action 212 may route a complex image review task to a specialist for the tissue type associated with the tissue sample image 206. In another example, a number of complex image review tasks may be routed to various respective pathologists according to a predetermined workload (e.g., evenly or substantially evenly) or to multiple pathologists for diagnostic confirmation.

By way of illustration, returning to FIGS. 5A-5C, FIGS. 5A-5C show a set of tissue sample slides 500 (e.g., tissue sample slide 500(1), tissue sample slide 500(2), tissue sample slide 500(3)) that each include a different section of a tissue sample block. As shown, the tissue sample block included sectionable fiducial markers that indicate a common orientation for the different sections of the tissue sample block. As an illustration, sections 502 (e.g., section 502(1), section 502(2), and section 502(3)) may each represent a different section of a sectionable fiducial marker that was included in the tissue sample block prior to sectioning of the tissue sample block. Using the systems and methods described herein, one or more of modules 102 (e.g., executing module 108) may determine a common orientation and/or a unified coordinate system for the tissue sample slides 500. FIG. 600 includes a view 600 that illustrates an actual or virtual aligning of tissue sample slides 500 in a determined common orientation and/or within a determined unified coordinate system.

In some examples, executing module 108 may execute tissue sample management action 212 by further presenting, via a graphical user interface 222, tissue sample image 206 oriented within the graphical user interface 222 based on the determined orientation of the section of the sectionable fiducial marker included in sectionable fiducial marker image 208.

Additionally or alternatively, as mentioned throughout the present application, embodiments of the present invention may be used to view and/or compare images of multiple different sections of sectionable tissue sample blocks. In such embodiments, tissue sample management action 212 may include determining an orientation of different sections of a sectionable fiducial marker included in different sections from a sectionable tissue sample block, images of which may be included in, e.g., the image 204 and/or the additional image 214. Hence, in some examples, executing module 108 may execute tissue sample management action 212 by presenting, via a graphical user interface such as graphical user interface 222, (1) tissue sample image 206 oriented within graphical user interface 222 based on the determined orientation of the section of the sectionable fiducial marker included in sectionable fiducial marker image 208, and (2) additional tissue sample image 216 oriented within graphical user interface 222 based on the determined orientation of the additional section of the sectionable fiducial marker included in additional sectionable fiducial marker image 218.

Figure 6:
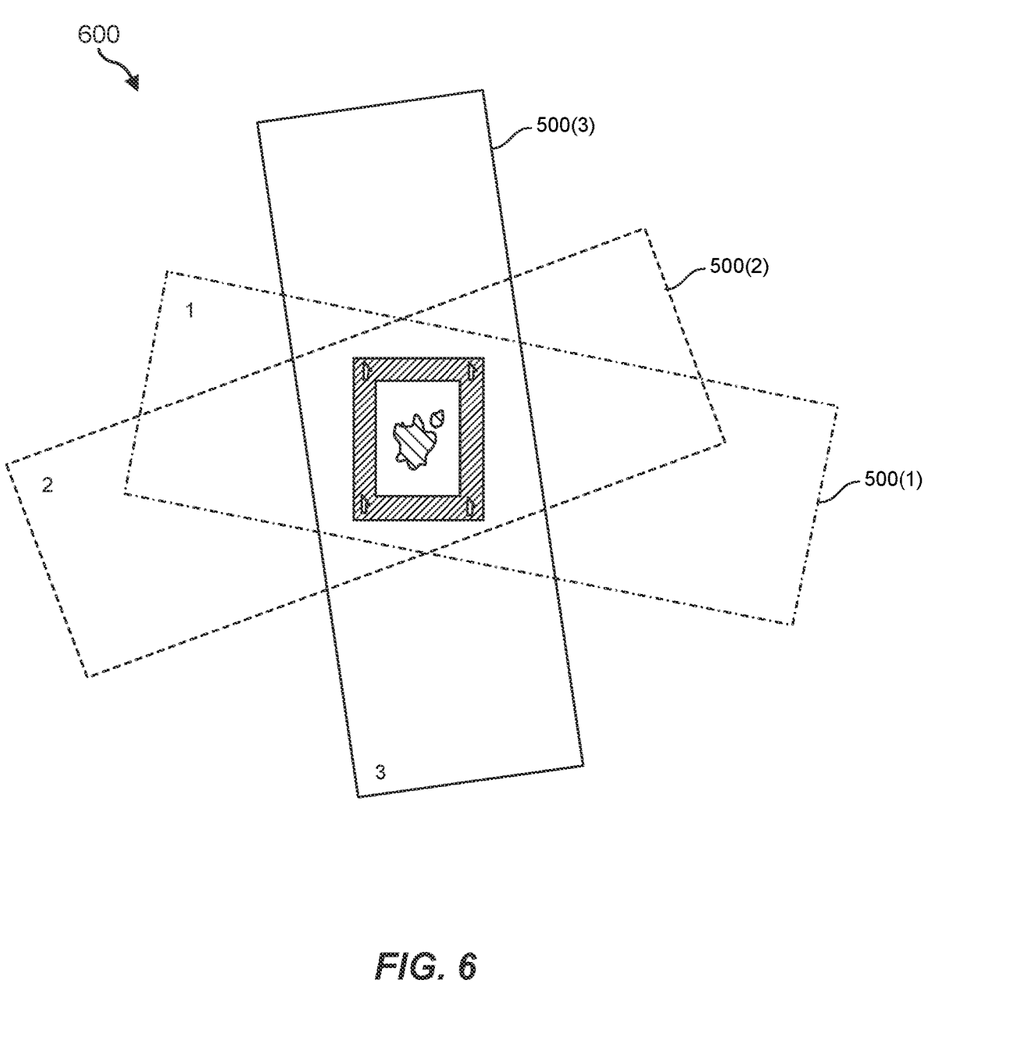
FIG. 6 includes a view of tissue samples and/or tissue sample slides aligned in a common orientation in accordance with some embodiments described herein.

Using the unified coordinate system mentioned above, multiple images from the set can be displayed within the graphical user interface 222 overlapping in the same window (e.g., like tissue sample slides 500 in view 600 of FIG. 6). Additionally, or alternatively, multiple images from the same set may be presented within graphical user interface 222 simultaneously in different windows with the same orientation relative to the tissue sample, despite potential misalignment on the original slides (e.g., as shown in FIGS. 5A-5C).

In some examples, executing module 108 may present tissue sample image 206 and additional tissue sample image 216 aligned in a common orientation based on the determined orientation of the section of the sectionable fiducial marker included in sectionable fiducial marker image 208 and the determined orientation of the additional section of the sectionable fiducial marker included in additional sectionable fiducial marker image 218. In some embodiments, this may include overlying tissue sample image 206 and additional tissue sample image 216 within graphical user interface 222 and/or positioning tissue sample image 206 adjacent to and in a same orientation as additional tissue sample image 216.

Figure 7:
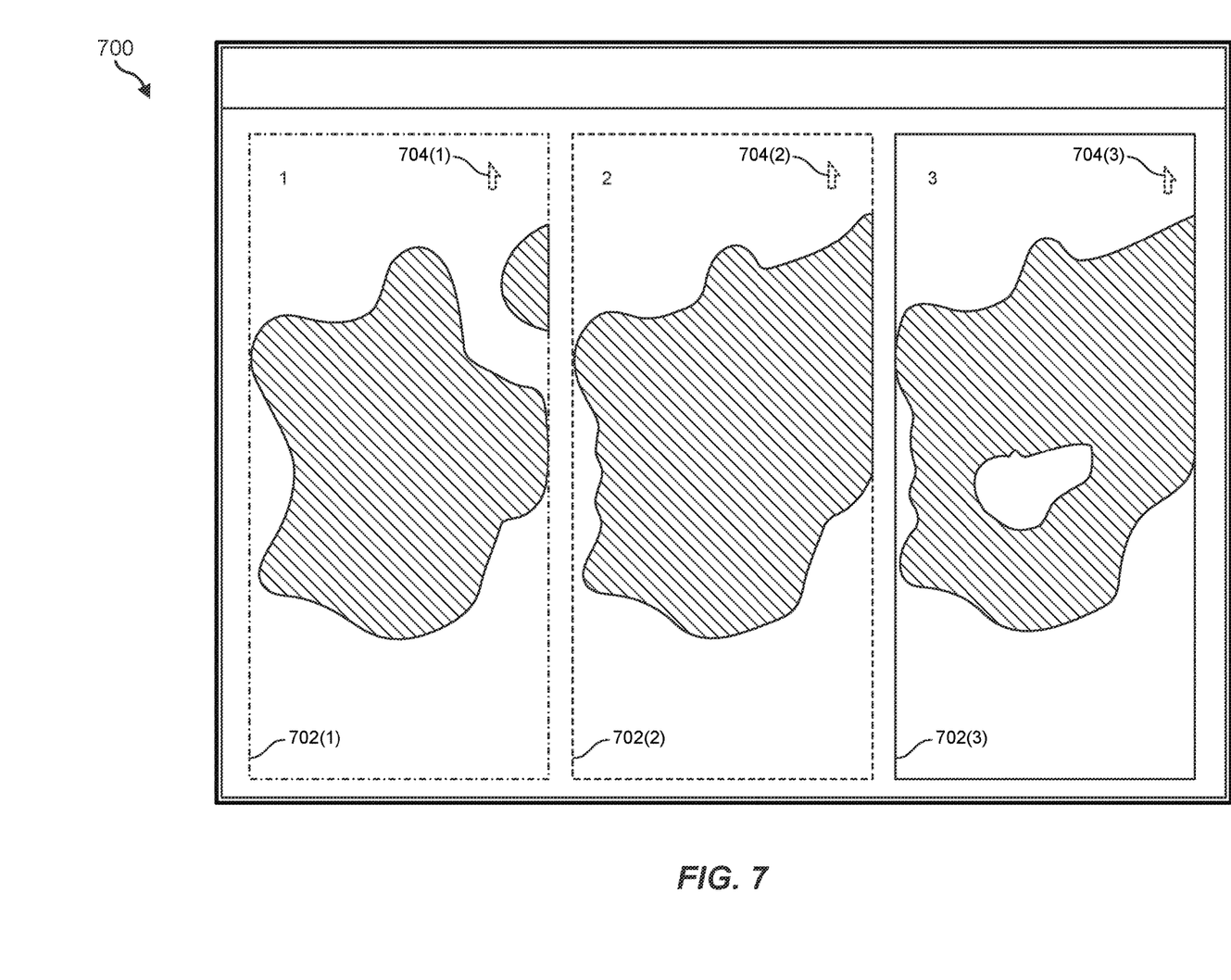
FIG. 7 includes a view of a graphical user interface that shows sections of a tissue sample oriented within the graphical user interface in accordance with some embodiments described herein.

By way of illustration, FIG. 7 shows a view 700 of a graphical user interface, such as graphical user interface 222. In this example, three different tissue sample section images 702 (e.g., tissue sample section image 702(1), tissue sample section image 702(2), and tissue sample section image 702(3)) are displayed in different windows with the same orientation relative to the tissue sample despite potential misalignment on the original slides. As shown, an orientation of tissue sample images 702 may be determined based on an image of a section of a sectionable fiducial marker 704 (e.g., section 704(1), section 704(2), and section 704(3)). Each of the tissue sample images 702 may be associated with a different image of a different section of the same sectionable fiducial marker (e.g., section 704(1) may be associated with tissue sample section 702(1), section 704(2) may be associated with tissue sample section 702(2), and section 704(3) may be associated with tissue sample section 702(3)). As indicated by dashed lines in FIG. 7, images of sectionable fiducial marker 704 may optionally be included in and/or presented along with tissue sample section images 702. In other examples, images of sections 704 may be omitted.

In some examples, a user (e.g., a pathologist) may interact with the graphical user interface 222 by moving one of the images. In response, executing module 108 may cause one or more of the other images to automatically move to a corresponding secondary tissue sample location. Hence, embodiments of the methods and systems of the present disclosure may allow for synchronized panning and zooming across two or more images. The effect may appear very natural to the user and may save significant time for the pathologist in reviewing all levels in a case.

In addition, the pathologist may compare tissue samples stained by a standard stain (e.g., an "H&E" stain) side-by-side (or overlapping) with tissue samples of the same region stained by a special stain. Embodiments of the present disclosure may also help ensure compliance with best practices (e.g., by reducing the likelihood that a pathologist will fail to review every level of a tissue sample).

In additional embodiments, executing module 108 may enable a user to interact with graphical user interface 222 by automatically transferring and/or displaying slide annotations entered by the user across multiple images. Annotations from one image can be displayed with transparency ("ghosted") in the corresponding regions of other images. Hence, embodiments of the systems and methods described herein may facilitate a digital or virtual equivalent of an analog or real-world ink dot technique used by pathologists to overlay identified foci on transparent (e.g., glass) slides, but with increased accuracy, redundancy, and speed.

The ghosting of the annotations across images may also be used to build training data sets for additional machine learning models. For example, two or more of the images 702 may represent tissue stained with different stains. When tissue of interest (e.g., abnormal tissue) is identified and annotated in one of the images 702 of tissue stained with a first stain, the annotations may be transferred to another image 702 of the tissue stained with a second, different stain. The transferred annotations can be added to a training data set for a machine learning model that may be specifically designed to review images of tissue stained with the second, different stain.

As discussed throughout the instant disclosure, the disclosed systems and methods may provide one or more advantages over traditional options for aligning and/or presenting tissue sample images and/or slides. Embodiments of the present disclosure may be employed to automatically align digital slide images, without the need for user intervention (e.g., identifying similar and/or overlapping tissue structures at the different levels, scaling images, etc.). In addition, in some examples, the methods and systems of the present disclosure may, by identifying and using sectionable fiducial markers for alignment, more accurately align images compared to conventional techniques that may use tissue structures for alignment.

Other potential applications and/or embodiments may include Z-plane stacking (e.g., review of a third-dimension plane of focus simultaneously) or, instead of viewing multiple images side-by-side, scrolling through overlayed linked images in a single window.

The following example embodiments are also included in this disclosure:

Example 1: A computer-implemented method comprising (1) receiving an image of a section of a sectionable tissue sample block, the image comprising image data of, embedded into the section of the sectionable tissue sample block, (A) a section of a tissue sample, and (B) a section of a sectionable fiducial marker, (2) determining an attribute of the section of the sectionable fiducial marker from the received image of the section of the sectionable tissue sample block, and (3) executing a tissue sample management action based on the determined attribute of the section of the sectionable fiducial marker.

Example 2: The computer-implemented method of example 1, further comprising embedding at least one of the tissue sample and the sectionable fiducial marker into the sectionable tissue sample block prior to a sectioning of the sectionable tissue sample block into a plurality of sections, the section of the sectionable tissue sample block included in the plurality of sections.

Example 3: The computer-implemented method of any of examples 1-2, wherein determining the attribute of the section of the sectionable fiducial marker from the received image of the section of the sectionable tissue sample block comprises determining at least one of (1) at least one wavelength of light reflected by the section of the sectionable fiducial marker, (2) a shape of the section of the sectionable fiducial marker, (3) an orientation of the section of the sectionable fiducial marker, or (4) a position of the section of the sectionable fiducial marker within the section of the sectionable tissue sample block.

Example 4: The computer-implemented method of any of examples 1-3, wherein executing the tissue sample management action comprises determining an orientation of the section of the sectionable fiducial marker relative to at least one of (1) the sectionable tissue sample block, (2) a tissue sample slide that includes the section of the sectionable tissue sample block, or (3) the section of the tissue sample embedded into the section of the sectionable tissue sample block.

Example 5: The computer-implemented method of example 4, wherein executing the tissue sample management action further comprises presenting, via a graphical user interface, the section of the tissue sample oriented within the graphical user interface based on the determined orientation of the section of the sectionable fiducial marker.

Example 6: The computer-implemented method of any of examples 1-5, further comprising (1) receiving an image of an additional section of the sectionable tissue sample block, the additional section of the sectionable tissue sample block comprising image data of, embedded into the additional section of the sectionable tissue sample block, (A) an additional section of the tissue sample, and (B) an additional section of the sectionable fiducial marker, and (2) determining an attribute of the additional section of the sectionable fiducial marker from the received image of the additional section of the sectionable tissue sample block.

Example 7: The computer-implemented method of example 6, wherein executing the tissue sample management action comprises determining (1) an orientation of the section of the sectionable fiducial marker relative to at least one of (A) the sectionable tissue sample block, (B) a tissue sample slide that includes the section of the sectionable tissue sample block, or (C) the section of the tissue sample embedded into the section of the sectionable tissue sample block, and (2) an orientation of the additional section of the sectionable fiducial marker relative to at least one of (A) the sectionable tissue sample block, (B) an additional tissue sample slide that includes the additional section of the sectionable tissue sample block, or (C) the additional section of the tissue sample embedded into the additional section of the sectionable tissue sample block.

Example 8: The computer-implemented method of example 7, wherein the tissue sample management action further comprises presenting, via a graphical user interface, (1) the image data of the section of the tissue sample oriented within the graphical user interface based on the determined orientation of the section of the sectionable fiducial marker, and (2) the image data of the additional section of the tissue sample oriented within the graphical user interface based on the determined orientation of the additional section of the sectionable fiducial marker.

Example 9: The computer-implemented method of example 8, further comprising presenting the image data of the section of the tissue sample and the image data of the additional section of the tissue sample aligned in a common orientation based on the determined orientation of the section of the sectionable fiducial marker and the determined orientation of the additional section of the sectionable fiducial marker.

Example 10: The computer-implemented method of example 9, wherein presenting the image data of the section of the tissue sample and the image data of the additional section of the tissue sample aligned in a common orientation based on the determined orientation of the section of the sectionable fiducial marker and the determined orientation of the additional section of the sectionable fiducial marker comprises overlaying the imaging data of the section of the tissue sample with the imaging data of the additional section of the tissue sample.

Example 11: The computer-implemented method of any of examples 7-10, wherein the tissue sample management action further includes (1) receiving an annotation from a user relative to a portion of the image data of the section of the tissue sample, (2) transferring the annotation to a corresponding portion of the image data of the additional section of the tissue sample; and (3) adding the transferred annotations to a training data set for a machine learning model for analyzing image data of tissue samples that share at least one attribute with the additional section of the tissue sample.

Example 12: The computer-implemented method of any of examples 1-11, wherein determining the attribute of the section of the sectionable fiducial marker from the received image of the section of the sectionable tissue sample block comprises analyzing the image of the section of the sectionable tissue sample block in accordance with a machine learning model pre-trained to predict attributes of sections of sectionable fiducial markers based on images of sections of sectionable fiducial markers.

Example 13: The computer-implemented method of example 12, further comprising training the machine learning model to predict attributes of sections of sectionable fiducial markers, the training comprising (1) analyzing a plurality of pre-labeled images of sections of sectionable fiducial markers in accordance with a predefined machine learning model training method, and (2) adjusting at least one attribute of the machine learning model based on the analyzing of the plurality of pre-labeled images of sections of sectionable fiducial markers.

Example 14: A system comprising (1) a receiving module, stored in memory and configured to receive an image of a section of a sectionable tissue sample block, the image comprising image data of, embedded into the section of the sectionable tissue sample block, (A) a section of a tissue sample, and (B) a section of a sectionable fiducial marker, (2) a determining module, stored in memory and configured to determine an attribute of the section of the sectionable fiducial marker from the received image of the section of the sectionable tissue sample block, and (3) an executing module, stored in memory and configured to execute a tissue sample management action based on the determined attribute of the section of the sectionable fiducial marker, and (4) at least one physical processor that executes the receiving module, the determining module, and the executing module.

Example 15: The system of example 14, wherein the determining module determines the attribute of the section of the sectionable fiducial marker from the received image of the section of the sectionable tissue sample block by determining at least one of (1) at least one wavelength of light reflected by the section of the sectionable fiducial marker, (2) a shape of the section of the sectionable fiducial marker, or (3) an orientation of the section of the sectionable fiducial marker, or (4) a position of the section of the sectionable fiducial marker within the section of the sectionable tissue sample block.

Example 16: The system of any of examples 14-15, wherein the executing module executes the tissue sample management action by determining an orientation of the section of the sectionable fiducial marker relative to at least one of (1) the sectionable tissue sample block, (2) a tissue sample slide that includes the section of the sectionable tissue sample block, or (3) the section of the tissue sample embedded into the section of the sectionable tissue sample block.

Example 17: The system of example 16, wherein the executing modules executes the tissue sample management action by presenting, via a graphical user interface, the image data of the tissue sample oriented within the graphical user interface based on the determined orientation of the section of the sectionable fiducial marker.

Example 18: The system of any of examples 14-17, wherein the determining module determines the attribute of the section of the sectionable fiducial marker from the received image of the section of the sectionable tissue sample block by analyzing the image of the section of the sectionable tissue sample block in accordance with a machine learning model pre-trained to predict attributes of sections of sectionable fiducial markers based on images of sections of sectionable fiducial markers.

Example 19: The system of example 18, wherein the determining module is further configured to train the machine learning model to predict attributes of sectioned portions of sectionable fiducial markers by (1) analyzing a plurality of pre-labeled images of sectioned portions of sectionable fiducial markers in accordance with a predefined machine learning model training method, and (2) adjusting at least one attribute of the machine learning model based on the analyzing of the plurality of pre-labeled images of sectioned portions of sectionable fiducial markers.

Example 20: A non-transitory computer-readable medium comprising computer-readable instructions that, when executed by at least one processor of a computing system, cause the computing system to (1) receive an image of a section of a sectionable tissue sample block, the image comprising image data of, embedded into the section of the sectionable tissue sample block, (A) a section of a tissue sample, and (B) a section of a sectionable fiducial marker, (2) determine an attribute of the section of the sectionable fiducial marker from the received image of the section of the sectionable tissue sample block, and (3) execute a tissue sample management action based on the determined attribute of the section of the sectionable fiducial marker.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data, output a result of the transformation to align tissue slide images included in the image data, use the result of the transformation to present aligned tissue slide images included in the image data, and store the result of the transformation to train a machine learning model to recognize images of sectionable fiducial markers. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving an image of a section of a sectionable tissue sample block, the image comprising image data of, embedded into the section of the sectionable tissue sample block:
      a section of a tissue sample; and
      a section of a sectionable fiducial marker;
   determining an attribute of the section of the sectionable fiducial marker from the received image of the section of the sectionable tissue sample block;
   determining an orientation of the section of the sectionable fiducial marker based on the determined attribute of the section of the sectionable fiducial marker; and
   presenting, via a graphical user interface, the image data of the section of the tissue sample in an orientation that is aligned with an orientation of an additional section of the tissue sample, wherein:
      the orientation of the section of the tissue sample is based on the determined orientation of the section of the sectionable fiducial marker;
      the orientation of the additional section of the tissue sample is based on a determined orientation of an additional section of the sectionable fiducial marker associated with the additional section of the tissue sample; and
      the orientation of the section of the tissue sample and the orientation of the additional section of the tissue sample represent a common orientation.

2. The computer-implemented method of claim 1, further comprising embedding the tissue sample and the sectionable fiducial marker into the sectionable tissue sample block prior to a sectioning of the sectionable tissue sample block into a plurality of sections.

3. The computer-implemented method of claim 2, wherein embedding the tissue sample and the sectionable fiducial marker into the sectionable tissue sample block comprises:
   placing the tissue sample within a pre-formed structure that includes the sectionable fiducial marker therein; and
   processing the tissue sample and the pre-formed structure, which includes the sectionable fiducial marker therein, together to form the sectionable tissue sample block.

4. The computer-implemented method of claim 1, wherein determining the orientation of the section of the sectionable fiducial marker comprises determining the orientation relative to at least one of:
   the sectionable tissue sample block;
   a tissue sample slide that includes the section of the sectionable tissue sample block; or
   the section of the tissue sample embedded into the section of the sectionable tissue sample block.

5. The computer-implemented method of claim 4, wherein the section of the sectionable fiducial marker is formed in an identifiable shape indicative of a particular direction.

6. The computer-implemented method of claim 5, wherein the identifiable shape is an arrow shape comprising a pointed end indicative of the particular direction.

7. The computer-implemented method of claim 1, further comprising:
   receiving an additional image of an additional section of the sectionable tissue sample block, the additional image comprising the image data of, embedded into the additional section of the sectionable tissue sample block:
      the additional section of the tissue sample; and
      the additional section of the sectionable fiducial marker; and
   determining the orientation of the additional section of the sectionable fiducial marker by determining the orientation of the additional section of the sectionable fiducial marker relative to at least one of:
      the sectionable tissue sample block;
      an additional tissue sample slide that includes the additional section of the sectionable tissue sample block; or
      the additional section of the tissue sample embedded into the additional section of the sectionable tissue sample block.

8. The computer-implemented method of claim 7, further comprising presenting, via the graphical user interface, the image data of the additional section of the tissue sample in the orientation that is aligned with the orientation of the section of the tissue sample.

9. The computer-implemented method of claim 8, wherein presenting, via the graphical user interface, the image data of the section of the tissue sample and the image data of the additional section of the tissue sample comprises overlaying the image data of the section of the tissue sample with the image data of the additional section of the tissue sample.

10. The computer-implemented method of claim 9, further comprising scrolling through the overlaid image data of the section of the tissue sample and the additional section of the tissue sample.

11. The computer-implemented method of claim 1, further comprising:
   receiving an annotation from a user relative to a portion of the image data of the section of the tissue sample;
   transferring the annotation to a corresponding portion of the image data of the additional section of the tissue sample; and
   adding the transferred annotation to a training data set for a machine learning model for analyzing image data of tissue samples that share at least one attribute with the additional section of the tissue sample.

12. The computer-implemented method of claim 1, wherein determining the attribute of the section of the sectionable fiducial marker from the received image of the section of the sectionable tissue sample block comprises analyzing the image of the section of the sectionable tissue sample block in accordance with a machine learning model pre-trained to predict attributes of sections of sectionable fiducial markers based on images of sections of sectionable fiducial markers.

13. The computer-implemented method of claim 12, further comprising training the machine learning model to predict attributes of sections of sectionable fiducial markers, the training comprising:
   analyzing a plurality of pre-labeled images of sections of sectionable fiducial markers in accordance with a pre-defined machine learning model training method; and adjusting at least one attribute of the machine learning model based on the analyzing of the plurality of pre-labeled images of sections of sectionable fiducial markers.

14. The computer-implemented method of claim 1, wherein determining the attribute of the section of the sectionable fiducial marker from the received image of the section of the sectionable tissue sample block comprises determining at least one of:
   at least one wavelength of light reflected by the section of the sectionable fiducial marker;
   a shape of the section of the sectionable fiducial marker;
   an orientation of the section of the sectionable fiducial marker; or
   a position of the section of the sectionable fiducial marker within the section of the sectionable tissue sample block.

15. A system comprising:
   at least one physical processor; and
   physical memory comprising computer-executable instructions that, when executed by the physical processor, cause the physical processor to:
      receive an image of a section of a sectionable tissue sample block, the image comprising image data of, embedded into the section of the sectionable tissue sample block:
         a section of a tissue sample; and
         a section of a sectionable fiducial marker;
      determine an attribute of the section of the sectionable fiducial marker from the received image of the section of the sectionable tissue sample block; and
      determine an orientation of the section of the sectionable fiducial marker based on the determined attribute of the section of the sectionable fiducial marker; and
      present, via a graphical user interface, the image data of the section of the tissue sample in an orientation that is aligned with an orientation of an additional section of the tissue sample, wherein:
         the orientation of the section of the tissue sample is based on the determined orientation of the section of the sectionable fiducial marker;
         the orientation of the additional section of the tissue sample is based on a determined orientation of an additional section of the sectionable fiducial marker associated with the additional section of the tissue sample; and
         the orientation of the section of the tissue sample and the orientation of the additional section of the tissue sample represent a common orientation.

16. The system of claim 15, wherein the physical processor determines the attribute of the section of the sectionable fiducial marker from the received image of the section of the sectionable tissue sample block by determining at least one of:
   at least one wavelength of light reflected by the section of the sectionable fiducial marker;
   a shape of the section of the sectionable fiducial marker;
   an orientation of the section of the sectionable fiducial marker; or
   a position of the section of the sectionable fiducial marker within the section of the sectionable tissue sample block.

17. The system of claim 15, wherein the section of the sectionable fiducial marker is formed in an identifiable shape indicative of a particular direction.

18. The system of claim 15, wherein the physical processor determines the attribute of the section of the sectionable fiducial marker from the received image of the section of the sectionable tissue sample block by analyzing the image of the section of the sectionable tissue sample block in accordance with a machine learning model pre-trained to predict attributes of sections of sectionable fiducial markers based on images of sections of sectionable fiducial markers.

19. The system of claim 18, wherein the computer-executable instructions further cause the physical processor to train the machine learning model to predict attributes of sectioned portions of sectionable fiducial markers by:
   analyzing a plurality of pre-labeled images of sectioned portions of sectionable fiducial markers in accordance with a predefined machine learning model training method; and
   adjusting at least one attribute of the machine learning model based on the analyzing of the plurality of pre-labeled images of sectioned portions of sectionable fiducial markers.

20. A non-transitory computer-readable medium comprising computer-readable instructions that, when executed by at least one processor of a computing system, cause the computing system to:
   receive an image of a section of a sectionable tissue sample block, the image comprising image data of, embedded into the section of the sectionable tissue sample block:
      a section of a tissue sample; and
      a section of a sectionable fiducial marker;
   determine an attribute of the section of the sectionable fiducial marker from the received image of the section of the sectionable tissue sample block;
   determine an orientation of the section of the sectionable fiducial marker based on the determined attribute of the section of the sectionable fiducial marker; and
   present, via a graphical user interface, the image data of the section of the tissue sample in an orientation that is aligned with an orientation of an additional section of the tissue sample, wherein:
      the orientation of the section of the tissue sample is based on the determined orientation of the section of the sectionable fiducial marker;
      the orientation of the additional section of the tissue sample is based on a determined orientation of an additional section of the sectionable fiducial marker associated with the additional section of the tissue sample; and
      the orientation of the section of the tissue sample and the orientation of the additional section of the tissue sample represent a common orientation.

* * * * *